United States Patent Office 3,436,445
Patented Apr. 1, 1969

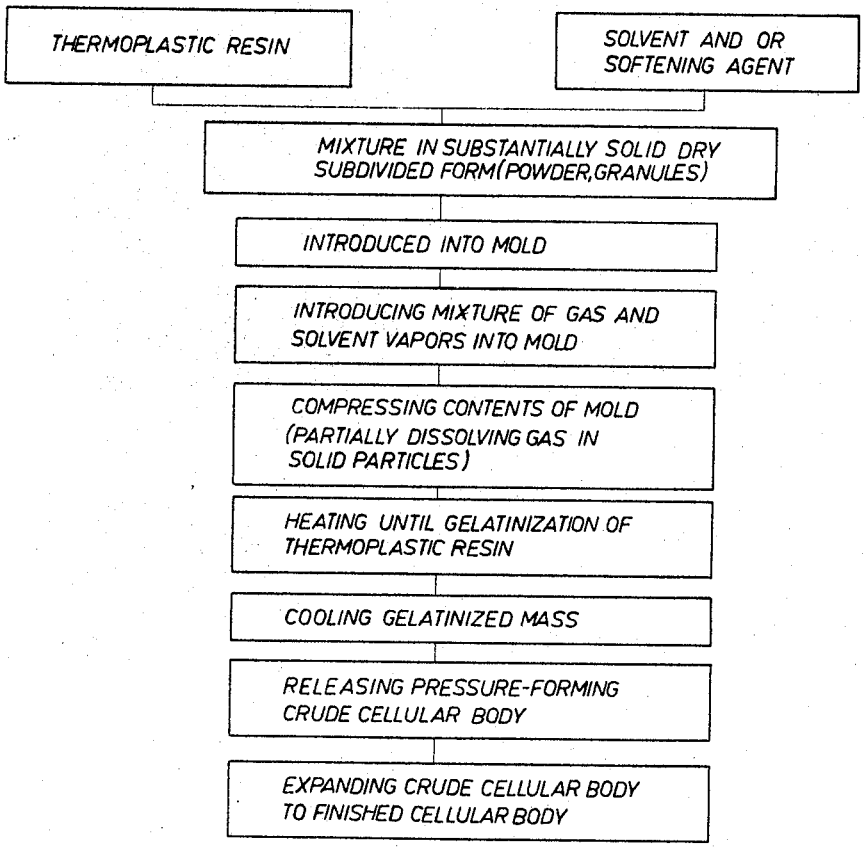

3,436,445
METHOD OF PRODUCING CELLULAR BODIES
Emil Brunner and Hans Hasler, Sins, and Alfred Huber, Mettmenstetten, Switzerland, assignors to Lonza Ltd., Basel, Switzerland
Filed Aug. 26, 1965, Ser. No. 482,946
Claims priority, application Switzerland, Aug. 27, 1964, 11,251/64
Int. Cl. C08j 1/16; C08f 47/08
U.S. Cl. 264—50
7 Claims

ABSTRACT OF THE DISCLOSURE

A closed-cell, gas containing cellular body of thermoplastic material is prepared by arranging in a mold a mass composed of substantially dry particles of solid thermoplastic material containing a solvent or swelling agent for the thermoplastic material, such compound being present in an amount sufficient to improve the gas-dissolving ability of the mass while retaining the substantially solid, dry condition of the same, introducing into the mold containing the mass a gaseous mixture of a gas which is insoluble at atmospheric pressure in the substantially dry, solid mass and of vapors of a solvent or swelling agent for the thermoplastic material, this gaseous mixture being introduced at a pressure sufficient to substantially evenly distribute the gaseous mixture in the substantially solid mass without causing complete dissolution thereof in the mass, compressing the contents of the mold and subjecting the same to an elevated temperature so as to cause gelatinization of the mass and dissolution of the gas therein, thereby forming a homogenous mass of thermoplastic material having the gas evenly distributed therethrough, and cooling the thus formed mass and releasing the pressure thereon and causing the mass to expand and thereby to form a closed-cell, gas-containing cellular body.

---

The present invention relates to a method of producing cellular bodies and, more particularly, the present invention is concerned with converting pulverulent or granular thermoplastic synthetic materials in pressure molds under utilization of gases as foaming agent into foamed, closed-cell, cellular bodies.

It has been proposed to produce closed cell cellular bodies of thermoplastic synthetic materials by first converting the thermoplastic material with solvents or swelling agents into a loose granular mass, introducing the granular mass into a gas-tight compression mold provided with a ram or piston which may be pushed into the mold in order to compress the contents thereof, to introduce a gas into the mold and thereafter, to dissolve the thus introduced gas in the granular mass by compression, while simultaneously compacting the mass in the mold.

The thus-formed, gas-containing compacted or compressed mass is then heated so as to gelatinize the thermoplastic synthetic material, followed by cooling and release of overpressure. Finally, the thus-obtained gas-containing mass of synthetic thermoplastic material is expanded by heating so as to form the desired closed cell, cellular or foamed body.

Furthermore, it has been propsed to improve the gas absorptivity of the synthetic thermoplastic material by incorporating therein liquids which are capable of dissolving the synthetic thermoplastic material or of causing swelling of the same.

The last mentioned method is more fully described in U.S. Patent No. 2,714,747 to H. Lindemann et al.

Thereby, gas may be advantageously introduced into the mold containing the granular thermoplastic material through inlet openings in the bottom of the mold, whereby the gas will be caused to flow into and to fill the interstices between the particles of the granular mass.

It has now been found that by carrying out the process, for instance as described in U.S. Patent No. 2,714, 747 with introduction of the gas through inlet openings in the bottom of a mold which contains the granular or thermoplastic material, the portions of the expanded, closed cell, cellular body which are formed of the material located in the mold in the vicinity of the inlet openings, will differ in their consistency from the remainder of the closed cell cellular body. The portion of the closed cell cellular body which is formed of thermoplastic material contacted by the gas immediately upon its introduction into the mold will be of different softness and cellular structure than the remainder of the closed-cell cellular body and may even contain open cells. This disadvantage is apparently caused by an exchange of solvent between solvent-free gas introduced into the mold and solvent-containing thermoplastic particles with which the gas comes first in contact within the mold, in the vicinity of the gas inlet openings of the mold. It is particularly apparent when large amounts of gas are introduced into the form and/or when closed cell cellular bodies of very low specific gravity or weight per unit of volume are to be produced.

It is therefore an object of the present invention to overcome the above-discussed difficulties and disadvantages.

It is a further object of the present invention to provide an improvement in producing closed cell cellular bodies for instance by the method which is disclosed in U.S. Patent No. 2,714,747.

Other objects and advantages of the present invention will become apparent from a further reading of the description and of the appended claims.

With the above and other objects in view, the present invention contemplates a process of preparing a closed-cell, gas-containing cellular body of thermoplastic material, comprising the steps of arranging in a mold a mass composed of substantially dry particles of solid thermoplastic material containing at least one compound selected from the group consisting of solvents and swelling agents for the thermoplastic material, the compound being present in an amount sufficient to improve the gas-dissolving ability of the mass while retaining the substantially solid, dry condition of the same, introducing into the mold containing the mass a gaseous mixture consisting essentially of a gas being substantially insoluble at atmospheric pressure in the substantially dry, solid mass and of vapors of at least one substance selected from the group consisting of solvents and swelling agents for the thermoplastic material the gaseous mixture being introduced at a pressure sufficient to substantially evenly distribute the gaseous mixture in the substantially solid mass without causing complete dissolution thereof in the mass, compressing the contents of the mold and subjecting the same to an elevated temperature so as to cause gelatinization of the mass and at least substantially complete solution of the gas therein thereby forming a homogenous mass of thermoplastic material having the gas evenly distributed therein, and cooling the thus formed mass and releasing the pressure thereon and causing the same to expand and to form a closed-cell gas-containing cellular body.

Thus, the present invention is concerned with a method of producing closed cell cellular bodies according to which solvent or swelling agent-containing thermoplastic material in granular form and having a relatively large surface area is introduced into a compression mold, the compression mold is then gas-tightly closed by insertion of a reciprocating ram, and gas is then introduced into the mold in the amount required for the later expansion of the thermoplastic material, whereby the pressure exerted by the thus introduced gas in the mold is insufficient for dissolving the entire amount of gas in the thermoplastic starting material, whereupon the thermoplastic material and the gas in the mold are compressed by movement of the ram, and the thermoplastic material is gelatinized, so as to form a mass in which nearly all of the introduced gas is dissolved. The mass, after cooling and release of overpressure, is removed from the mold and expansion and formation of the closed cell cellular body is then caused by heating of the same. The method of the present invention is particularly characterized by admixing to the gas, prior to introduction of the same into the mold, vapors of a solvent or swelling agent for the synthetic thermoplastic material in the mold.

Due to the fact that the gas which is thus introduced into the mold contains vapors of solvent or swelling agent, the gas upon its contact with the solvent or swelling agent-containing dry granular thermoplastic material will not deplete the solvent or swelling agent content of the first contacted portion of the granular mass, and thereby it will be prevented that the eventually produced closed cell body will be of different cellular characteristic, softness and structure in the area formed of granules which were located close to the point of introduction of the gas into the mold as compared with the remainder of the cellular body. The amount of solvent or swelling agent vapors which is to be incorporated in the gas depends primarily on the amount and on the volatility of the solvent or swelling agent in the granular thermoplastic material. The solvent or swelling agent vapor concentration in the gas should be sufficient to maintain a substantially homogeneous solvent or swelling agent distribution within the entire mold during introduction of gas into the same.

It is thus an important feature of the present invention that substantial reduction of the solvent or swelling agent content of the particles of thermoplastic material located in the mold in the vicinity of the gas inlet openings is prevented.

Due to the vapor pressure of the volatile solvent or swelling agent in the particles of synthetic material, the latter are surrounded by an atmospheric containing vaporized solvent or swelling agent. If, in accordance with conventional methods, solvent and swelling agent-free gas is introduced into the mold, equilibrium between the solvent or swelling agent content of thermoplastic particles and of the surrounding atmosphere will be disturbed, and additional solvent and/or swelling agent will be withdrawn from the thermoplastic particles and enter, in vapor form, the surrounding atmosphere. Thus, the solvent-free gas introduced into the mold and flowing along thermoplastic particles in the vicinity of the gas inlet openings will deplete the solvent or swelling agent content of these particles.

This is avoided, according to the present invention, by having solvent and/or swelling agent vapors incorporated into the gas which is introduced into the mold. Preferably, the solvent or swelling agent vapor content or partial vapor pressure of the introduced gaseous mixture will correspond to the partial solvent or swelling agent vapor pressure of the atmosphere surrounding the thermoplastic particles in the mold prior to introduction of the gaseous mixture. However, even a smaller solvent or swelling agent vapor content or partial pressure in the gaseous mixture which is introduced into the mold will at least partially counteract the depletion of the solvent or swelling agent content of the thermoplastic particles which would take place if a gas free of solvent or swelling agent vapors were introduced into the mold. On the other hand, the solvent or swelling agent vapor content of the gaseous mixture which is introduced into the mold must not be so high as to cause, under the conditions prevailing in the mold with respect to pressure and temperature, condensation of the solvent and/or swelling agent vapors.

The partial pressure of the solvent or swelling agent vapors in the gas, at the start of introduction of gas into the mold preferably should be equal to at least 5% of the equilibrium vapor pressure between the solvent or swelling agent incorporated in the thermoplastic material and contained in the gas phase above the granular mass in the closed mold just prior to introduction of the solvent or swelling agent vapors-containing gas. Preferably, the concentration of solvent or swelling agent vapors in the gas during introduction of the same into the mold will be so controlled that during the entire period of introduction of gas into the closed, granular synthetic thermoplastic material-containing mold the equilibrium pressure between solvent and or swelling agent in the thermoplastic material and in the gas phase will be maintained or at least will be reached at the time of termination of gas introduction. The partial pressure of the solvent or swelling agent vapors in the mold may reach saturation pressure if at all only at the time of termination of gas introduction under the pressure and temperature conditions prevailing at that time. It is important that at no time during introduction of the gas into the mold solvent or swelling agent vapors are permitted to condense at the surface of the synthetic thermoplastic material contained in the mold. Condensation of solvent or swelling agent vapors in the mold would result in the formation of a cellular body which, in the zone of such condensations, would include undesirable larger and smaller cavities.

The optimum amount of solvent or swelling agent vapors which is to be incorporated into the gas can be easily determined by those skilled in the art for each specific thermoplastic material and type of desired closed-cell cellular body, taking into consideration the above discussed requirements and also the desired hardness or softness of the end product and its desired weight per unit of volume.

A relatively simple and effective manner of adjusting the concentration of solvent or swelling agent vapors in the gas, prior to introduction of the same into the mold, consists in saturating the gas with the solvent and/or swelling agent vapors at the temperature at which the gas is to be introduced into the mold and at a pressure which is between 1 and 100 atmospheres higher than the pressure at the time of termination of gas introduction, i.e. at least somewhat higher than the pressure within the mold after introduction of gas has been completed, and thereafter expanding the thus compressed, solvent and/or swelling agent vapor saturated gas to the pressure at which introduction of the gas into the mold is to be started. However, it is also possible to introduce solvent or swelling agent vapors into the gas during introduction of the latter into the mold, so that during introduction of the gas into the mold at all times the equilibrium concentration between solvent or swelling agent dissolved in the thermoplastic material and located in the gas space in the mold will be maintained.

The present method is particularly well adapted for forming closed cell cellular bodies of synthetic thermoplastic resins or polymerized materials which are formed completely or partly of vinyl chloride. Mixed polymerizates or copolymerizates may be used which are produced of monomers such as vinyl acetate, vinylidene chloride and the like in addition to vinyl chloride.

The present invention may be carried out in connection with and as an improvement of the process disclosed in the above mentioned U.S. Patent No. 2,714,747 whereby, however, in accordance with the present invention, solvent and/or swelling agent vapors must be incorporated in the gas which is introduced into the mold containing the thermoplastic resin.

The starting material, i.e., the solvent or swelling agent-containing synthetic, thermoplastic resins may be converted into a granular form of relatively large surface area in various ways, known to those skilled in the art, depending on the specific material and described, for instance, in the U.S. Patent 2,714,747. The thermoplastic synthetic material may be employed in unplastified or plastified condition.

Pulverulent or granular polymerizates in unplastified condition, preferably, are mixed with solvents or swelling agents in an amount of between 20 and 50 parts by weight of solvent or swelling agent for each 100 parts per weight of polymerizate, and by stirring this mixture, a loose, dry, coarse granular mass is formed. The above described proportions of solvents or swelling agents are absorbed by the synthetic material under formation of dry, swollen granules.

If it is desired to produce a plastified granular starting material, the polymerizate is mixed with softener and volatile solvent. In this case, preferably, 100 parts by weight of polymerizate are mixed with between 10 and 90 parts by weight of plasticizer and between 3.3 and 30 parts by weight of solvent or swelling agent.

The specific solvents or swelling agents and softeners are chosen in accordance with the solubility or swelling characteristics of the polymerizate. Preferably, the solvent or swelling agent which is incorporated in the gas will be the same as that which is incorporated in the polymerizate.

The difference which is made herein between solvents and swelling agents on the one hand and softeners on the other hand is to be understood primarily as a difference in boiling points. Solvents or swelling agents in the context of the present invention have boiling points not exceeding between about 160° and 170° C., while the boiling points of softeners may be considerably higher.

Solvents and swelling agents which improve the solubility of the gas in polyvinyl chloride and its copolymerizates or mixed polymerizates include acetone, ethylmethyl ketone, butyl acetate, cyclohexanone, furane and chlorinated hydrocarbons. Conventional softeners for polyvinyl chloride and vinyl chloride copolymerizates and mixed polymerizates may be used, preferably dioctylphthalate, dioctyladipate, and the like.

It is also possible, if desired, to incorporate in the thermoplastic material conventional stabilizers, fillers or coloring agents.

After the solvent or swelling agent-containing thermoplastic material has been converted into the desired, finely subdivided, loose and compressible condition with increased ability to dissolve gas, for instance in the manner described in U.S. Patent 2,714,747, the thus formed mass is introduced into the pressure mold, the mold is then gas-tightly closed by insertion of the ram or piston, and thereafter the foaming agent, i.e., the solvent or swelling agent-containing gas is pressed into the mold. The amount of gas which is thus introduced into the mold will depend on the desired final degree of expansion of the thermoplastic body. The greater the degree of expansion, i.e., the smaller the weight per unit of volume of the closed cell cellular body which is to be produced, the greater will be the amount of gas which is to be pressed into the mold. Generally, it is advantageous to press into the mold a quantity of gas such that the final pressure in the mold, i.e., the pressure at which introduction of gas is terminated, will be equal to between about 20 and 70 atmospheres.

Hydrogen, nitrogen, carbon dioxide or other gases which are inert under the prevailing operating conditions or mixtures thereof, well known to those skilled in the art, may be introduced into the mold as foaming agent after solvent and/or swelling agent vapors have been admixed thereto.

After completion of gas introduction, the ram or piston is pressed into the mold until a pressure of between about 200 and 500 atmospheres has been reached in the mold and the mold is heated for a period of for instance, between 2 and 6 hours to a temperature of between about 150° and 180° C., whereby the gas will be dissolved in the thermoplastic material and the latter will be gelatinized. Thereafter, the mass in the mold is cooled and by pressure release which may be carried out in a stepwise manner an intermediate body is formed which already may be a cellular body. The intermediate body is then again heated in conventional manner so as to cause foaming and formation of the final closed-cell, cellular body.

The following examples of the present invention are given as illustrative only without, however, limiting the invention to the specific details of the examples.

Example I 50 kilograms of a granular mass consisting of 40 parts by weight dioctylphthalate, 60 parts by weight polyvinyl chloride, 3 parts by weight of a conventional lead stabilizer, and 14 parts by weight methylethyl ketone, are introduced into a pressure mold having a capacity of 58 liters. Thereafter a gaseous mixture is pressed into the mold until the pressure therein rises to 38 atmospheres above atmospheric pressure. The gaseous mixture is formed by saturating nitrogen gas at 60 atmospheres above atmospheric pressure and 22° C. with methylethyl ketone. Saturation of the gas with the solvent vapors is thus carried out at a pressure higher than the pressure in the mold after completion of the introduction of the gaseous mixture. Upon termination of the introduction of the gaseous mixture in the mold, i.e., when a pressure of 38 atmospheres above atmospheric pressure has been reached therein, each cubic meter of gas in the mold will contain between 380 and 390 grams of methylethyl ketone while for condensation of the methylethyl ketone in the mold at such pressure and the temperature prevailing in the mold a concentration of between 470 and 480 grams per cubic meter would be required.

After thus forming in the mold an intimate mixture of the solvent-containing polymerizate and the solvent-containing nitrogen gas, the thus formed mixture is further compressed and the polymerizate gelatinized, in a manner known per se, by subjecting the contents of the mold to a pressure of 280 atmospheres above atmospheric pressure and a temperature of 170° C. The mass in the mold is then cooled and pressure is released. The intermediate cellular body produced in this manner is then placed in a heating cabinet and expanded therein, in conventional manner, to form a closed cell cellular body having a spatial weight of 0.08 gram per cubic centimeter and a uniform cellular structure throughout.

Example II 30 kilograms of a mixture of 75 parts by weight of a copolymer of 90% vinyl chloride and 10% vinyl acetate, 3 parts by weight of a conventional lead stabilizer and 10 parts by weight methylethyl ketone are introduced in granular form into a pressure mold having a capacity of 35 liters. After closing of the mold, a hydrogen-nitrogen gas mixture is pressed into the same until the pressure in the mold has risen to 20 atmospheres. Prior to introduction of the gas mixture, the same had been saturated with methylethyl ketone at 20° C. and at a pressure of 40 atmospheres above atmospheric pressure so that, upon terminating the introduction of gas into the mold at a pressure of 20 atmospheres above atmospheric pressure, between 220 and 250 grams methylethyl ketone vapors are contained in one cubic meter of gas. Under these conditions, condensation of the methylethyl ketone would take place only at a concentration of between 350 and 380 grams per cubic meter. Further processing of the thus-formed polymerizate-gas mixture is carried out as described in Example I, and again a closed-cell cellular body is obtained having a uniform and fault-free cellular structure throughout.

Example III 50 kilograms of a granular mixture consisting of 100 parts by weight polyvinyl chloride, 4 parts by weight of a lead stabilizer, 2 parts by weight titanium oxide and 40 parts by weight methylethyl ketone are placed into a pressure mold having a capacity of 58 liters. After hermetically closing the mold, nitrogen gas is introduced into the same until the final pressure in the mold has risen to 45 atmospheres above atmospheric pressure. The nitrogen gas, prior to being introduced into the mold has been saturated at a pressure of 60 atmospheres above atmospheric pressure with methylethyl ketone.

The thus-formed mixture in the mold is then compressed in conventional manner, gelatinized, and thereafter the pressure is released in a step-wise manner under cooling. The thus-formed intermediate cellular body is removed from the mold and subjected to final expansion by heating in conventional manner. The thus obtained closed cell cellular body is of homogeneous cellular structure and has a density or weight per cubic centimeter of 0.06 gram.

What is claimed as new and desired to be secured by Letters Patent is:

1. A process of preparing a closed-cell, gas-containing cellular body of thermoplastic material, comprising the steps of arranging in a mold a mass composed of substantially dry particles of solid thermoplastic material containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas being substantially insoluble at atmospheric pressure in said substantially dry, solid mass and of vapors of at least one substance selected from the group consisting of solvents and swelling agents for said thermoplastic material, said gaseous mixture being introduced at a pressure sufficient to substantially evenly distribute said gaseous mixture in said substantially solid mass without causing complete dissolution thereof in said mass; compressing the contents of said mold and subjecting the same to an elevated temperature so as to cause gelatinization of said mass and at least substantially complete solution of said gas therein thereby forming a homogenous mass of thermoplastic material having said gas evenly distributed therein; and cooling the thus formed mass and releasing the pressure thereon and causing the same to expand and to form a closed-cell, gas-containing cellular body.

2. A process of preparing a closed-cell, gas-containing cellular body of thermoplastic synthetic material, comprising the steps of arranging in a mold a granular mass composed of substantially dry particles of solid thermoplastic synthetic material containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas being substantially insoluble at atmospheric pressure in said substantially dry, solid mass and of vapors of at least one substance selected from the group consisting of solvents and swelling agents for said thermoplastic material, said gaseous mixture being introduced at a pressure sufficient to substantially evenly distribute said gaseous mixture in said substantially solid granular mass without causing complete dissolution thereof in said mass; compressing the contents of said mold and subjecting the same to an elevated temperature so as to cause gelatinization of said mass and at least substantially complete solution of said gas therein thereby forming a homogenous mass of thermoplastic material having said gas evenly distributed therein; cooling the thus formed mass in said mold and releasing the pressure thereon; removing the cooled mass from said mold; and heating said mass to a temperature sufficient to expand the same and to form thereof a closed-cell, gas-containing cellular body.

3. A process of preparing a closed-cell, gas-containing cellular body of thermoplastic synthetic material, comprising the steps of arranging in a mold a granular mass composed of substantially dry particles of solid thermoplastic synthetic material containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas selected from the group consisting of hydrogen, nitrogen and carbon dioxide, and of vapors of at least one substance selected from the group consisting of solvents and swelling agents for said thermoplastic material, said gaseous mixture being introduced at a pressure sufficient to substantially evenly distribute said gaseous mixture in said substantially solid granular mass without causing complete dissolution thereof in said mass; compressing the contents of said mold and subjecting the same to an elevated temperature so as to cause gelatinization of said mass and at least substantially complete solution of said gas therein thereby forming a homogenous mass of thermoplastic material having said gas evenly distributed therein; cooling the thus formed mass in said mold and releasing the pressure thereon; removing the cooled mass from said mold; and heating said mass to a temperature sufficient to expand the same and to form thereof a closed-cell, gas-containing cellular body.

4. A process of preparing a closed-cell, gas-containing cellular body of thermoplastic synthetic material, comprising the steps of arranging in a mold a granular mass composed of substantially dry particles of solid thermoplastic synthetic material consisting at least partially of polymerized vinyl chloride and containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas being substantially insoluble at atmospheric pressure in said substantially dry, solid mass and of vapors of at least one substance selected from the group consisting of solvents and swelling agents for said themoplastic material, said gaseous mixture being introduced at a pressure sufficient to substantially evenly distribute said gaseous mixture in said substantially solid granular mass without causing complete dissolution thereof in said mass; compressing the contents of said mold and subjecting the same to an elevated temperature so as to cause gelatinization of said mass and at least substantially complete solution of said gas therein thereby forming a homogenous mass of thermoplastic material having said gas evenly distributed therein; cooling the thus formed mass in said mold and releasing the pressure thereon; removing the cooled mass from said mold; and heating said mass to a temperature sufficient to expand the same and to form thereof a closed-cell, gas-containing cellular body.

5. A process of preparing a closed-cell, gas-containing cellular body of thermoplastic synthetic material, comprising the steps of arranging in a mold a granular mass composed of substantially dry particles of solid themoplastic synthetic material containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas being substantially insoluble at atmospheric pressure in said substantially dry, solid mass and of vapors of at least one substance selected from the group consisting of solvents and swelling agents for said thermoplastic material, said gaseous mixture being introduced at a pressure sufficient to substantially evenly distribute said gaseous mixture in said substantially solid granular mass without causing complete dissolution thereof in said mass, the concentration of said vapors being sufficiently small so as to prevent condensation thereof in said mold; compressing the contents of said mold and subjecting the same to an elevated temperature so as to cause gelatinization of said mass and at least substantially complete solution of said gas therein thereby forming a homogenous mass of thermoplastic material having said gas evenly distributed therein; cooling the thus formed mass in said mold and releasing the pressure thereon; removing the cooled mass from said mold; and heating said mass to a temperature sufficient to expand the same and to form thereof a closed-cell, gas-containing cellular body.

6. A process of preparing a closed-cell, gas-containing cellular body of thermoplastic synthetic material, comprising the steps of arranging in a mold a granular mass composed of substantially dry particles of solid thermoplastic synthetic material containing at least one compound selected from the group consisting of solvents and swelling agents for said thermoplastic material, said compound being present in an amount sufficient to improve the gas-dissolving ability of said mass while retaining the substantially solid, dry condition of the same; introducing into said mold containing said mass a gaseous mixture consisting essentially of a gas being substantially insoluble at atmospheric pressure in said substantially dry, solid mass and of vapors of at least one substance selected from the group consisting of solvents and swelling agents for said thermoplastic material, said gaseous mixture being introduced at a pressure sufficient to substantially evenly distribute said gaseous mixture in said substantially solid granular mass without causing complete dissolution thereof in said mass, the partial vapor pressure of said substance in said gaseous mixture at the start of introduction of said gaseous mixture into said mold being equal to at least 5% of the equilibrium vapor pressure of said compound contained in said solid thermoplastic material and remaining during the entire period of introduction of said gaseous mixture into said mold below said equilibrium vapor pressure; compressing the contents of said mold and subjecting the same to an elevated temperature so as to cause gelatinization of said mass and at least substantially complete solution of said gas therein thereby forming a homogenous mass of thermoplastic material having said gas evenly distributed therein; cooling the thus formed mass in said mold and releasing the pressure thereon; removing the cooled mass from said mold; and heating said mass to a temperature sufficient to expand the same and to form thereof a closed-cell, gas-containing cellular body.

7. A method according to claim 2 wherein during introduction of said gaseous mixture into said mold the partial vapor pressure of said substance is maintained substantially equal to the equilibrium vapor pressure of said compound.

References Cited

UNITED STATES PATENTS

| 2,714,747 | 8/1955 | Lindemann et al. | 264—50 |
| 3,194,854 | 7/1965 | Smith | 264—53 |

PHILIP E. ANDERSON, *Primary Examiner.*

U.S. Cl. X.R.

260—2.5; 264—53